United States Patent
Dalsgaard et al.

(10) Patent No.: US 8,467,793 B2
(45) Date of Patent: Jun. 18, 2013

(54) MOBILITY FOR USER EQUIPMENT IN CLOSED SUBSCRIBER GROUP ENVIRONMENT

(75) Inventors: Lars Dalsgaard, Oulu (FI); Jarkko Koskela, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/127,183

(22) PCT Filed: Oct. 30, 2009

(86) PCT No.: PCT/IB2009/054837
§ 371 (c)(1),
(2), (4) Date: Dec. 8, 2011

(87) PCT Pub. No.: WO2010/049911
PCT Pub. Date: May 6, 2010

(65) Prior Publication Data
US 2012/0122460 A1    May 17, 2012

Related U.S. Application Data

(60) Provisional application No. 61/197,987, filed on Oct. 31, 2008.

(51) Int. Cl.
*H04W 36/04* (2009.01)
*H04W 48/16* (2009.01)

(52) U.S. Cl.
USPC .......................................... 455/444; 455/434

(58) Field of Classification Search
USPC .............. 455/434, 555, 509, 436, 422.1, 423, 455/525, 437, 449, 524, 404.1, 452.1; 370/329, 370/252, 229, 332, 354, 507
See application file for complete search history.

(56) References Cited

U.S. PATENT DOCUMENTS

| | | | | |
|---|---|---|---|---|
| 5,966,668 | A | * | 10/1999 | Lindroth ........................ 455/555 |
| 2006/0062237 | A1 | * | 3/2006 | Kim ............................... 370/432 |
| 2006/0142032 | A1 | * | 6/2006 | Derakhshan et al. .......... 455/509 |
| 2009/0104905 | A1 | * | 4/2009 | DiGirolamo et al. .......... 455/434 |

OTHER PUBLICATIONS

3GPP TS 36.300 V8.6.0 (Sep. 2008) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) (137 pages).
3GPP TSG CT WG1 Meeting #55 C1-083596; *Definition of Variable length CSG id within the Cell Identity*; Budapest, Hungary, Aug. 18-22, 2008 (4 pages).
3GPP TS 25.304 V8.3.0 (Sep. 2008) 3rd Generation Partnership Project; Technical Specification Group Radio Access Network; User Equipment (UE) procedures in idle mode and procedures for cell reselection in connected mode (Release 8) (45 pages).
3GPP TSG RAN WG2 #63bis R2-085921; Sep. 29-Oct. 3, Prague, Czech Republic; LTE CP Session Report; (38 pages).
3GPP TS 36.304 V8.3.0 (Sep. 2008) 3rd Generation Partnership Project; Technical Specification Group Radio Access Network; Evolved Universal Terrestrial Radio Access (E-UTRA); User Equipment (UE) procedures in idle mode (Release 8) (28 pages).
3GPP TSG RAN Wg2 #63 bis, R2-08xxxx, $3^{rd}$ Generation Partnership Project, "Chairman Notes", Sep. 29-Oct. 3, 2008 Prague, Czech Republic, 36 pages.

* cited by examiner

*Primary Examiner* — Kiet Doan
(74) *Attorney, Agent, or Firm* — Harrington & Smith

(57) ABSTRACT

In one exemplary embodiment, a method including: receiving an intra-frequency cell re-selection indicator in combination with physical cell identity split information from a closed subscriber group cell or a macro cell, where the intra-frequency cell re-selection indicator is indicative of whether or not a mobile station is allowed to camp on a cell that is not ranked as best; and making an intra-frequency cell selection/re-selection decision based on the received intra-frequency cell re-selection indicator and the physical cell identity split information.

20 Claims, 6 Drawing Sheets

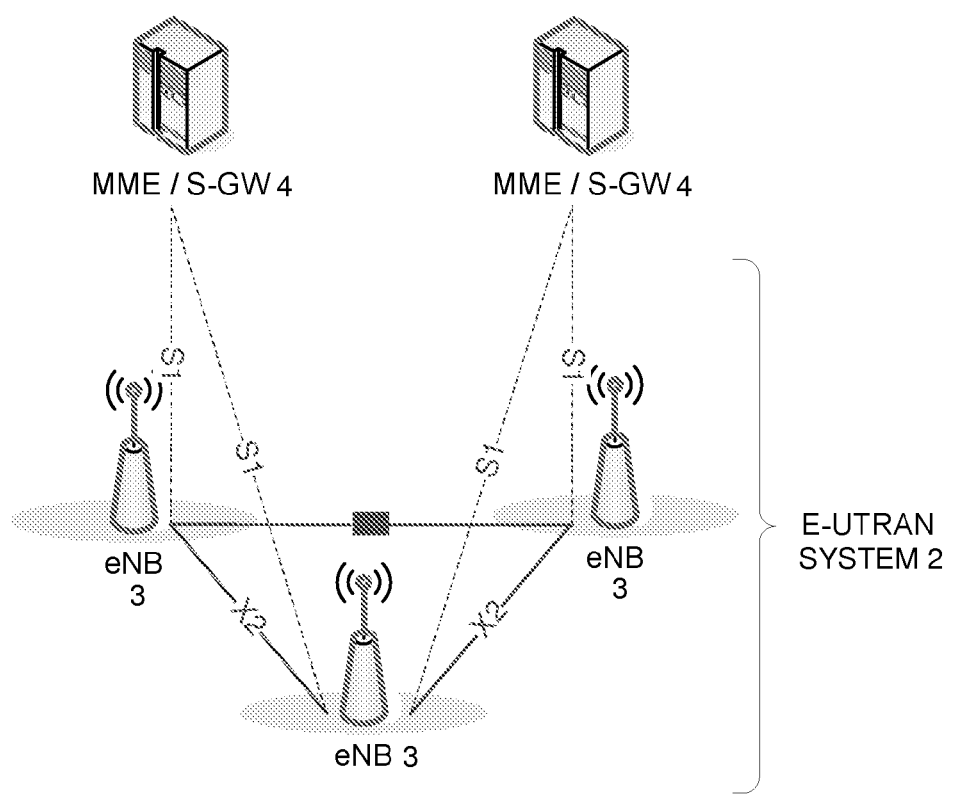
FIG. 1: PRIOR ART

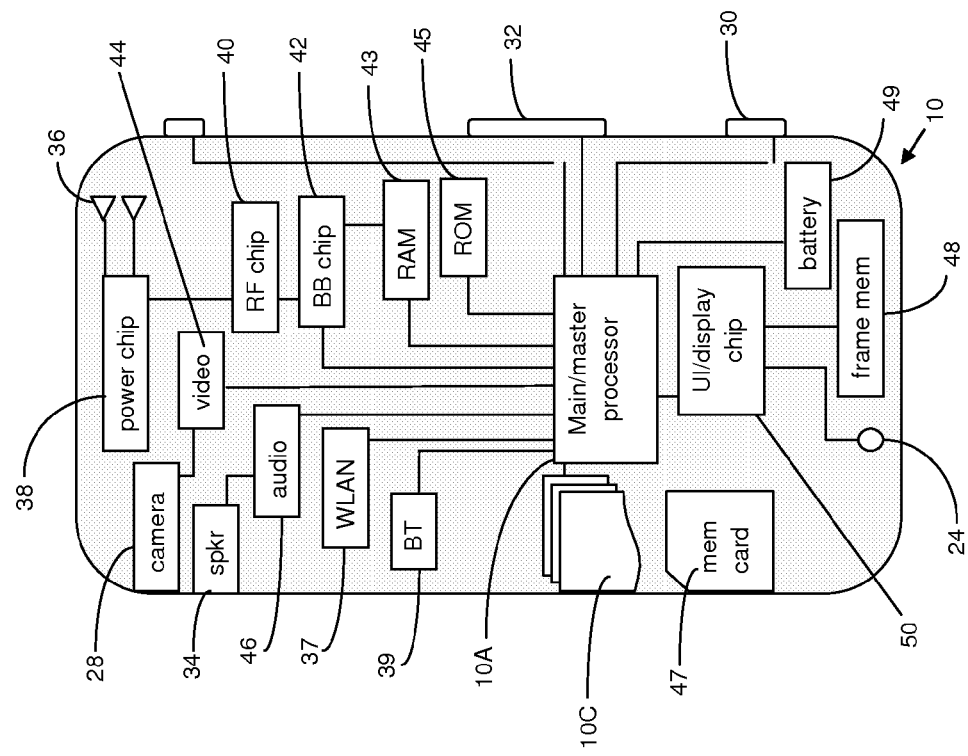
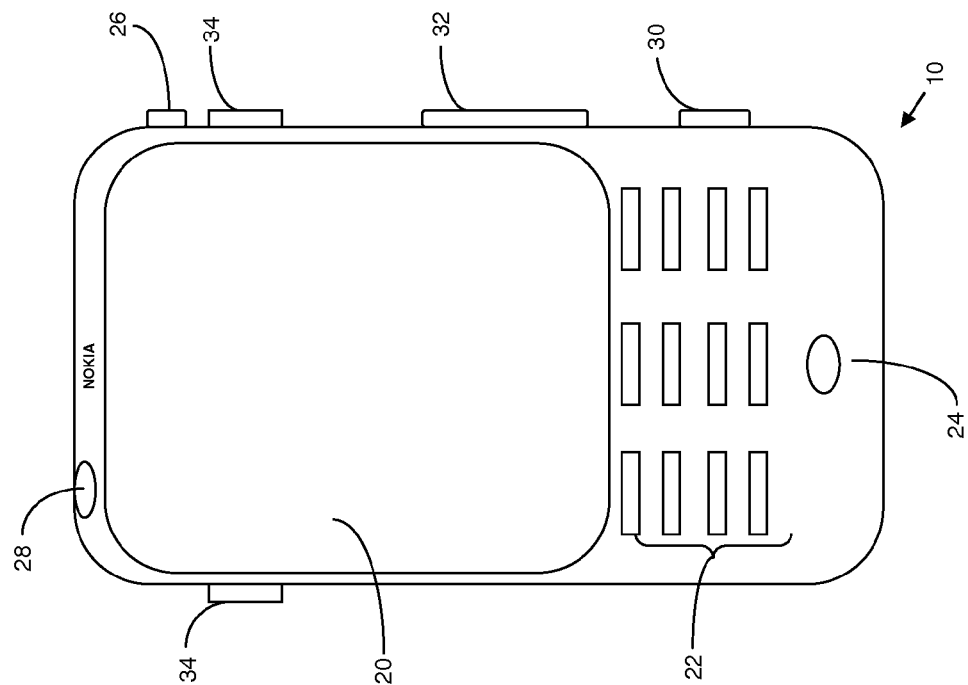
FIG. 2B

*SystemInformationBlockType4* information element

```
-- ASN1START

SystemInformationBlockType4 ::=      SEQUENCE {
    intraFreqNeighCellList
IntraFreqNeighCellList        OPTIONAL,  -- Need OR
    intraFreqBlackCellList
IntraFreqBlackCellList                 OPTIONAL,  -- Need OR
    csg-PhysCellIdRange
PhysCellIdRange               OPTIONAL,  -- Cond CSG
    intraFreqReselection                  ENUMERATED
{allowed, notAllowed},
    ...
}

IntraFreqNeighCellList ::=     SEQUENCE (SIZE
(1..maxCellIntra)) OF IntraFreqNeighCellInfo IntraFreqNeighCellInfo ::=    SEQUENCE {
    physCellId                            PhysCellId,
    q-OffsetCell                          Q-OffsetRange,
    ...
}

IntraFreqBlackCellList ::=     SEQUENCE (SIZE
(1..maxCellBlack)) OF PhysCellIdRange

-- ASN1STOP
```

FIG. 6

MOBILITY FOR USER EQUIPMENT IN CLOSED SUBSCRIBER GROUP ENVIRONMENT

RELATED APPLICATION

This application was originally filed as PCT Application No. PCT/IB2009/054837 filed on Oct. 30, 2009 and claims priority to U.S. Provisional Application No. 61/197987 filed Oct. 30, 2008, which is incorporated herein by reference in its entirety.

TECHNICAL FIELD

The exemplary and non-limiting embodiments of this invention relate generally to wireless communication systems, methods, devices and computer programs and, more specifically, relate to user equipment mobility-related aspects of closed subscriber group operation.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
BS base station
BW bandwidth
CSG closed subscriber group
DL downlink (eNB towards UE)
eNB E-UTRAN Node B (evolved Node B)
EPC evolved packet core
E-UTRAN evolved UTRAN (LTE)
FDMA frequency division multiple access
IE information element
LTE long term evolution of UTRAN (E-UTRAN)
MAC medium access control (layer 2, L2)
MM/MME mobility management/mobility management entity
Node B base station
OFDMA orthogonal frequency division multiple access
O&M operations and maintenance
PCI physical cell identity
PDCP packet data convergence protocol
PHY physical (layer 1, L1)
PLMN public land mobile network
RAT radio access technology
RLC radio link control
RRC radio resource control
RRM radio resource management
S-GW serving gateway
SC-FDMA single carrier, frequency division multiple access
SIB system information block
TDD time division duplex
UE user equipment, such as a mobile station or mobile terminal
UL uplink (UE towards eNB)
UTRAN universal terrestrial radio access network The specification of a communication system known as evolved UTRAN (E-UTRAN, also referred to as UTRAN-LTE or as E-UTRA) is currently nearing completion within the 3GPP. As specified the DL access technique is OFDMA, and the UL access technique is SC-FDMA.

One specification of interest is 3GPP TS 36.300, V8.6.0 (2008-09), "3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8)," incorporated by reference herein in its entirety.

FIG. 1 reproduces FIG. 4.1 of 3GPP TS 36.300 V8.6.0, and shows the overall architecture of the E-UTRAN system 2. The E-UTRAN system 2 includes eNBs 3, providing the E-UTRAN user plane (PDCP/RLC/MAC/PHY) and control plane (RRC) protocol terminations towards the UE (not shown). The eNBs 3 are interconnected with each other by means of an X2 interface. The eNBs 3 are also connected by means of an S1 interface to an EPC, more specifically to a MME by means of a S1 MME interface and to a S-GW by means of a S1U interface (MME/S-GW 4). The S1 interface supports a many-to-many relationship between MMEs/S-GWs and eNBs.

The eNB hosts the following functions:

functions for RRM: RRC, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

In general, a registered owner of a home eNB may add subscribers to its user group, and it is members of the user group that are allowed access to the CSG cell. Because one or more home eNBs can be linked to form more than one CSG cell contiguous with one another, it is convenient to term such an arrangement a CSG network. That is, a CSG network is a network composed of one or more cells with access permissions managed at least partially by final consumers (end users). Those subscribers registered as members of the user group are called CSG members. That is, a CSG member is a wireless service (e.g., cellular) user registered to the CSG network by the CSG administrator. Once registered, the CSG member is allowed to access the CSG network. Those users or devices not registered to the CSG are not allowed access to it, hence the term closed subscriber group. In CSG networks, only the devices (e.g., UEs) that have been granted permission to access the CSG network may camp or connect to that network. Examples of CSG cells include a home eNB (e.g., LTE cells that are purchased and/or operated by the consumer), corporate cells (e.g., cells that are hired or owned by a company), and "commercial" cells (cells that are owned by retail companies, supermarkets, etc.). It is the responsibility of the CSG administrator to register a user as a CSG member. While the CSG network can quickly control and modify the subscribers that form its user group, as noted above access is restricted to registered subscribers and closed to other users.

Mobility of the user group members between the CSG network and other cells that are "open" (non-CSG cells, whether they be E-UTRAN, UTRAN, GERAN, or others, for example) is possible.

The concept of the CSG network may be considered useful in the context of, by example, a corporate or university campus or a retail establishment. For example, the corporation or university provides its employees/students with free or low cost access to the CSG by enrolling them in the appropriate user group while simultaneously restricting others (e.g., unregistered users and devices) from accessing the service (via the CSG network).

Of particular interest herein is the use of CSG idle mode mobility in E-UTRAN.

One issue that has been agreed to in 3GPP (RAN2#63bis) regards whether the UE should be informed about a possible PCI split. Various potential aspects related to this issue include: making the UE aware of the PCI split on a mixed carrier; fixing the split in the specification is not possible (flexibility is needed for different deployments); the PCI split shall be signaled by the home-(e)NBs on the mixed carrier (mandatory); may be sent by macro cells on the mixed carrier (optional); once the UE has read the PCI split from a CSG cell on a mixed carrier, it may assume this split for 24 hours for this carrier, PLMN wide scope; and information may be included in a SIB (e.g., SIB4 in LTE/E-UTRAN; which SIB to use in UMTS is still to be decided). In this context, a "macro cell" may be considered to be a non-CSG cell.

The above-referenced PCI split refers to a reservation of PCIs to be used for CSG cells in a CSG co-channel deployment, where of a total number of available PCIs (e.g., approximately 500 in E-UTRAN) some are reserved for CSG cells while the remainder are used for the macro cells (non-CSG cells).

Additionally, in connection with the mixed carrier deployment (i.e., CSG and non-CSG cells deployed on a same frequency and thus using intra-frequency cell re-selection mobility), it has been discussed that use of an "intra-frequency cell re-selection indicator" would be useful. This indicator would be used for indicating to the UE whether it is allowed to camp on a cell which is not ranked as a best cell according to a normal intra-frequency cell re-selection evaluation procedure.

The current understanding of CSG mobility is that if the UE has reselected to a CSG cell, for example, due to it being the best ranked cell, the UE would check if the CSG cell is listed in the UE's "whitelist" (if the UE has a whitelist). The whitelist is a list of CSG identities to which the UE has access (it may be referred to as a CSG allowed list). While the exact content of the whitelist is currently not specified, it may be assumed that it will include at least some of the following: carrier frequency, RAT, frequency band, physical cell ID (PCI), the CSG identity and possibly one or more additional parameters. If the CSG is not listed on the whitelist (or the UE has no whitelist), the UE cannot camp on the CSG cell. As a result, the UE cannot obey the basic intra-frequency cell re-selection rule of being camped on the best cell and, thus, would need to reselect away from the CSG cell and the associated frequency.

It is pointed out that the CSG ID is not the same as the network ID. Within a given network (e.g., identified with a PLMN) there may be one or more CSG cells. These CSG cells are identified with a CSG bit plus a CSG identity. The actual CSG identity may have several formats depending on the size (number of cells) that constitute the CSG. As such, it may be appreciated that a subscriber to one CSG in the network/PLMN may not have access to another CSG in the same network/PLMN. General reference in this regard may be made to 3GPP TSG CT WG1 Meeting #55, Budapest, Hungary, 18-22 Aug. 2008, C1-083596, "Definition of Variable length CSG id within the Cell identity", Vodafone, Qualcomm, Telecom Italia.

The above-mentioned intra-frequency cell re-selection indicator would inform the UE if it would be allowed to camp on another cell on the same frequency, even though that other cell would not be the best ranked. If this is allowed (camping on the non-best cell), then the UE can evaluate its intra-frequency cell re-selection algorithm and reselect to the second-best ranked cell on the frequency. If this (camping on the non-best cell) is not allowed, the UE would have to reselect away from the current frequency layer, i.e., perform inter-frequency or inter-RAT cell re-selection.

As presently considered, the intra-frequency cell re-selection indicator would be cell specific and broadcast on the CSG cell. That is, the intra-frequency cell re-selection indicator would be broadcast in the target cell of the re-selection.

With regard to the use of a conventional UTRA cell re-selection indicator, 3GPP TS 25.304, V8.3.0 (2008-09) 3rd Generation Partnership Project; Technical Specification Group Radio Access Network; User equipment (UE) procedures in idle mode and procedures for cell re-selection in connected mode (Release 8), states in section 5.3.1.1:

When cell status "barred" is indicated,

The UE is not permitted to select/re-select this cell, not even for emergency calls.

The UE shall ignore the "Cell Reserved for future extension (Cell Reservation Extension) use" IE.

The UE is not permitted to receive any MBMS services.

The UE shall select another cell according to the following rule:

If the "Intra-frequency cell re-selection indicator" IE in Cell Access Restriction IE is set to value "allowed", the UE may select another cell on the same frequency if selection/re-selection criteria are fulfilled.

If the UE is camping on another cell, the UE shall exclude the barred cell from the neighbouring cell list until the expiry of a time interval $T_{barred}$. The time interval $T_{barred}$ is sent via system information in a barred cell together with Cell status information in the Cell Access Restriction IE.

If the UE does not select another cell, and the barred cell remains to be the "best" one, the UE shall after expiry of the time interval $T_{barred}$ again check whether the status of the barred cell has changed.

If the "Intra-frequency cell re-selection indicator" IE is set to "not allowed" the UE shall not re-select a cell on the same frequency as the barred cell. During an ongoing emergency call, the Intra-frequency cell re-selection indicator IE shall be ignored, i.e. even if it is set to "not allowed" the UE may select another intra-frequency cell.

If the barred cell remains to be the "best" one, the UE shall after expiry of the time interval $T_{barred}$ again check whether the status of the barred cell has changed.

The reselection to another cell may also include a change of RAT.

Additional publications that are related to the various topics discussed above include:

3GPP TSG RAN WG2 #63bis, 29 Sep.-3 Oct. 2008, Prague, Czech Republic, R2-085921;

3GPP TSG RAN WG2 #63bis, 29 Sep.-3 Oct. 2008, Prague, Czech Republic, R2-085836; and 3GPP TSG RAN WG2 #63bis, 29 Sep.-3 Oct. 2008, Prague, Czech Republic, R2-08xxxx (Chairman notes).

SUMMARY

The below summary section is intended to be merely exemplary and non-limiting.

The foregoing and other problems are overcome, and other advantages are realized, by the use of the exemplary embodiments of this invention.

In one exemplary embodiment of the invention, a method comprising: receiving an intra-frequency cell re-selection indicator in combination with physical cell identity split information from a closed subscriber group cell or a macro cell, where the intra-frequency cell re-selection indicator is indicative of whether or not a mobile station is allowed to camp on a cell that is not ranked as best; and making an intra-frequency cell selection/re-selection decision based on the received intra-frequency cell re-selection indicator and the physical cell identity split information.

In another exemplary embodiment of the invention, a program storage device readable by a machine, tangibly embodying a program of instructions executable by the machine for performing operations, said operations comprising: receiving an intra-frequency cell re-selection indicator in combination with physical cell identity split information from a closed subscriber group cell or a macro cell, where the intra-frequency cell re-selection indicator is indicative of whether or not a mobile station is allowed to camp on a cell that is not ranked as best; and making an intra-frequency cell selection/re-selection decision based on the received intra-frequency cell re-selection indicator and the physical cell identity split information.

In a further exemplary embodiment of the invention, an apparatus comprising: means for receiving an intra-frequency cell re-selection indicator in combination with physical cell identity split information from a closed subscriber group cell or a macro cell, where the intra-frequency cell re-selection indicator is indicative of whether or not a mobile station is allowed to camp on a cell that is not ranked as best; and means for making an intra-frequency cell selection/re-selection decision based on the received intra-frequency cell re-selection indicator and the physical cell identity split information.

In another exemplary embodiment of the invention, a method comprising: storing an intra-frequency cell re-selection indicator and physical cell identity split information, where the intra-frequency cell re-selection indicator is indicative of whether or not a mobile station is allowed to camp on a cell that is not ranked as best; and transmitting the intra-frequency cell re-selection indicator with the physical cell identity split information in at least one closed subscriber group cell, at least one macro cell or at least one closed subscriber group cell and at least one macro cell.

In a further exemplary embodiment of the invention, a program storage device readable by a machine, tangibly embodying a program of instructions executable by the machine for performing operations, said operations comprising: storing an intra-frequency cell re-selection indicator and physical cell identity split information, where the intra-frequency cell re-selection indicator is indicative of whether or not a mobile station is allowed to camp on a cell that is not ranked as best; and transmitting the intra-frequency cell re-selection indicator with the physical cell identity split information in at least one closed subscriber group cell, at least one macro cell or at least one closed subscriber group cell and at least one macro cell.

In another exemplary embodiment of the invention, an apparatus comprising: means for storing an intra-frequency cell re-selection indicator and physical cell identity split information, where the intra-frequency cell re-selection indicator is indicative of whether or not a mobile station is allowed to camp on a cell that is not ranked as best; and means for transmitting (means for sending or means for communicating) the intra-frequency cell re-selection indicator with the physical cell identity split information in at least one closed subscriber group cell, at least one macro cell or at least one closed subscriber group cell and at least one macro cell.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIG. 1 reproduces FIG. 4 of 3GPP TS 36.300 V8.6.0, and shows the overall architecture of the E-UTRAN system.

FIG. 2B shows a more particularized block diagram of an exemplary user equipment such as that shown in FIG. 2A.

FIG. 6 shows an exemplary SIB4 that includes the proposed intra-frequency cell re-selection indicator information.

DETAILED DESCRIPTION

At least one problem with the proposed approach of making the cell re-selection indicator cell-specific, and broadcasting it on the CSG cell, is that the UE would eventually have to reselect to every CSG cell in order to read the intra-frequency cell re-selection indicator in order to determine further cell re-selection actions based on the setting of the intra-frequency cell re-selection indicator. This type of behavior would lead to an increased amount of cell re-selection, as well as to undesirably complex and power wasting behavior. Additionally, the use of this approach implies the introduction of a requirement that the UE read the SIB from CSG neighbor cells in order to obey the cell re-selection rules specified for E-UTRAN (e.g., in section 5.2, "Cell selection and re-selection," of 3GPP TS 36.304 V8.3.0 (2008-09) 3rd Generation Partnership Project; Technical Specification Group Radio Access Network; Evolved Universal Terrestrial Radio Access (E-UTRA); User Equipment (UE) procedures in idle mode (Release 8)). In addition, the use of the proposed procedure would imply that non-CSG UEs would be impacted by the deployment of CSG cells in a co-channel deployment case.

Figure 2A:
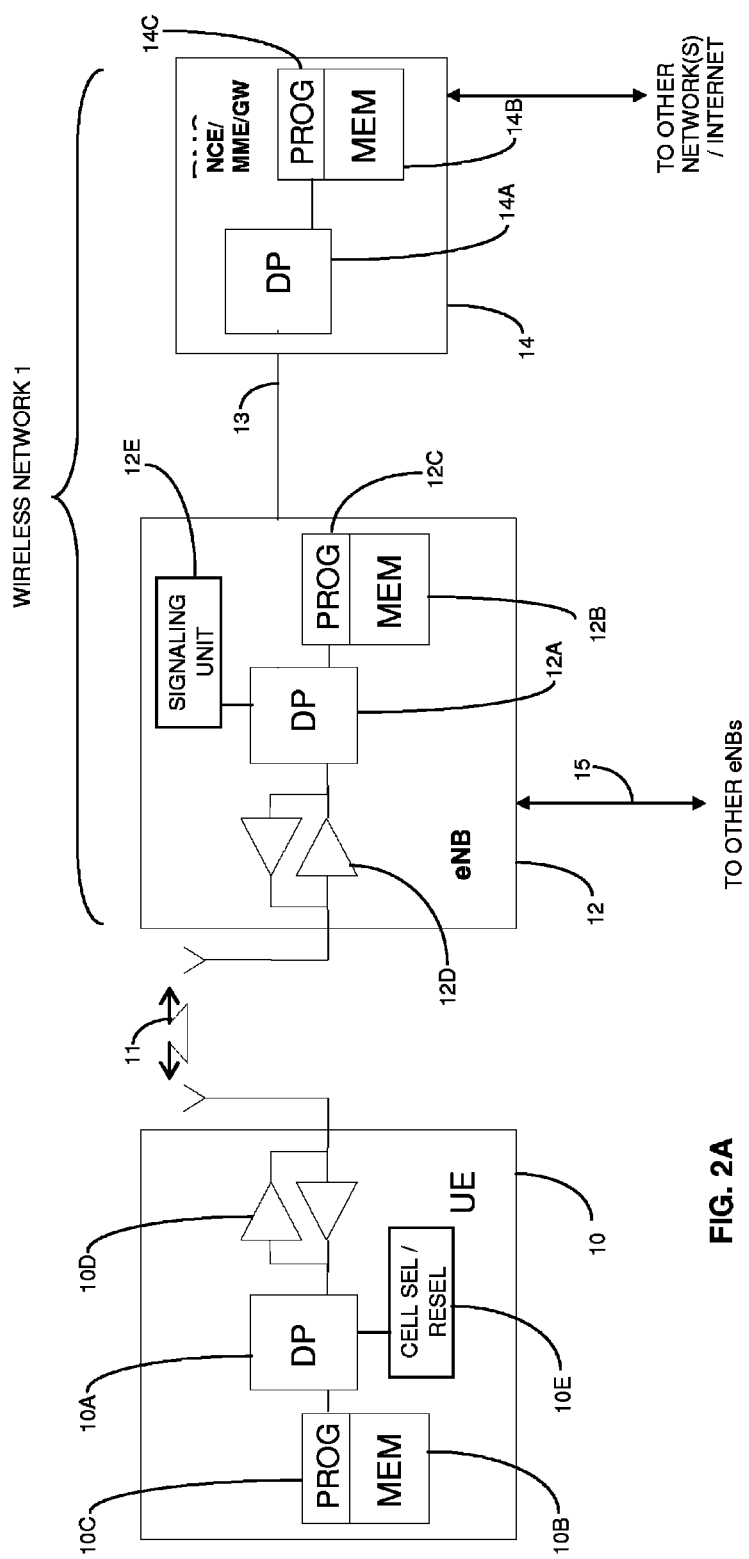
FIG. 2A shows a simplified block diagram of various exemplary electronic devices that are suitable for use in practicing the exemplary embodiments of this invention.

Before describing in further detail the exemplary embodiments of this invention, reference is made to FIG. 2A for illustrating a simplified block diagram of various exemplary electronic devices and apparatus that are suitable for use in practicing the exemplary embodiments of this invention. In FIG. 2A, a wireless network 1 is adapted for communication over a wireless link 11 with an apparatus, such as a mobile communication device which may be referred to as a user equipment (UE) 10, via a network access node, such as a Node B (base station), and more specifically an eNB 12. The network 1 may include a network control element (NCE) 14 that may include the MME/S-GW functionality shown in FIG. 1, and which provides connectivity with one or more other networks, such as a telephone network and/or a data communications network (e.g., the Internet). The UE 10 includes a controller, such as a computer, processor or data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas.

The eNB 12 includes a controller, such as a computer, processor or data processor (DP) 12A, a computer-readable memory medium embodied as a memory (MEM) 12B that stores a program of computer instructions (PROG) 12C, and a suitable radio frequency (RF) transceiver 12D for communication with the UE 10 via one or more antennas. The eNB 12 is coupled via a data/control path 13 to the NCE 14. As a non-limiting example, the path 13 may be implemented as the S1 interface shown in FIG. 1.

The NCE 14 includes a controller, such as a computer, processor or data processor (DP) 14A and a computer-readable memory medium embodied as a memory (MEM) 14B that stores a program of computer instructions (PROG) 14C. As noted above, the NCE 14 is coupled via a data/control path 13 to the eNB 12. The eNB 12 may also be coupled to one or more other eNBs via data/control path 15, which may be implemented as the X2 interface shown in FIG. 1, for example.

For the purposes of describing the exemplary embodiments of this invention, the UE 10 may be assumed to also include a cell selection/re-selection unit (CELL SEL/RESEL) 10E, and the eNB 12 may include a signaling unit 12E.

At least one of the PROGs 10C and 12C is assumed to include program instructions that, when executed by the associated DP 10A, 12A, enable the respective device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

In general, the various embodiments of the UE 10 can include, but are not limited to, mobile nodes, mobile stations, mobile phones, cellular phones, personal digital assistants (PDAs) having wireless communication capabilities, mobile routers, relay stations, relay nodes, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

FIG. 2B illustrates further detail of an exemplary UE 10 in both plan view (left) and sectional view (right). Exemplary embodiments of the invention may be embodied in one or more combinations that include one or more function-specific components, such as those shown in FIG. 2B. As shown in FIG. 2B, the UE 10 includes a graphical display interface 20, a user interface 22 comprising a keypad, a microphone 24 and speaker(s) 34. In further exemplary embodiments, the UE 10 may also encompass touch-screen technology at the graphical display interface 20 and/or voice-recognition technology for audio signals received at the microphone 24. A power actuator 26 controls the UE 10 being turned on and/or off by the user. The UE 10 may include a camera 28, which is shown as forward facing (e.g., for video calls) but may alternatively or additionally be rearward facing (e.g., for capturing images and video for local storage). The camera 28 may be controlled by a shutter actuator 30 and optionally by a zoom actuator 30, which may alternatively function as a volume adjustment for the speaker(s) 34 when the camera 28 is not in an active mode.

Within the sectional view of FIG. 2B are seen multiple transmit/receive antennas 36 that are typically used for wireless communication (e.g., cellular communication). The antennas 36 may be multi-band for use with other radios in the UE. The operable ground plane for the antennas 36 is shown by shading as spanning the entire space enclosed by the UE housing, though in some embodiments the ground plane may be limited to a smaller area, such as disposed on a printed wiring board on which a power chip 38 is formed. The power chip 38 controls power amplification on the channels being transmitted on and/or across the antennas that transmit simultaneously, where spatial diversity is used, and amplifies received signals. The power chip 38 outputs the amplified received signal to the radio frequency (RF) chip 40, which demodulates and downconverts the signal for baseband processing. The baseband (BB) chip 42 detects the signal, which is then converted to a bit-stream and finally decoded. Similar processing occurs in reverse for signals generated in the UE 10 and transmitted from it.

Signals to and from the camera 28 pass through an image/video processor (video) 44, which encodes and decodes the image data (e.g., image frames). A separate audio processor 46 may also be present to control signals to and from the speakers (spkr) 34 and the microphone 24. The graphical display interface 20 is refreshed from a frame memory (frame mem) 48 as controlled by a user interface/display chip 50, which may process signals to and from the display interface 20 and/or additionally process user inputs from the keypad 22 and elsewhere.

Certain exemplary embodiments of the UE 10 may also include one or more secondary radios such as a wireless local area network radio (WLAN) 37 and/or a Bluetooth® radio (BT) 39, which may incorporate one or more on-chip antennas or be coupled to one or more off-chip antennas. Throughout the UE 10 are various memories, such as a random access memory (RAM) 43, a read only memory (ROM) 45, and, in some exemplary embodiments, a removable memory such as the illustrated memory card 47. In some exemplary embodiments, the various programs 10C are stored on the memory card 47. The components within the UE 10 may be powered by a portable power supply such as a battery 49.

The aforesaid processors 38, 40, 42, 44, 46, 50, if embodied as separate entities in the UE 10 or the eNB 12, may operate in a master-slave relationship with respect to the main/master processor 10A, 12A. Exemplary embodiments of this invention need not be disposed in a central location, but may instead be disposed across various chips and memories as shown or disposed within another processor that combines some of the functions described above for FIG. 2B. Any or all of these various processors of FIG. 2B may access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which, in some exemplary embodiments, may include an array of tower-mounted antennas rather than the antennas 36 shown in FIG. 2B.

Note that the various processors and/or chips (e.g., 38, 40, 42, etc.) described above may be combined into a fewer number of such processors and/or chips and, in a most compact case, may be embodied physically within a single processor or chip.

While described above in reference to memories, these components may generally be seen to correspond to storage devices, storage circuits, storage components and/or storage blocks. In some exemplary embodiments, these components may comprise one or more computer-readable mediums, one or more computer-readable memories and/or one or more program storage devices.

While described above in reference to processors, these components may generally be seen to correspond to processors, data processors, processing devices, processing components, processing blocks, circuits, circuit devices, circuit components, circuit blocks, integrated circuits and/or chips (e.g., chips comprising one or more circuits or integrated circuits).

Describing now the exemplary embodiments of this invention, a procedure is used to indicate (possibly at a cell-specific level) an "intra-frequency cell re-selection indicator," possibly together with the already agreed to broadcast of the PCI-split information.

Combined with the above mentioned agreements (i.e., the PCI split information shall be broadcast on the CSG cell and may be broadcast on the macro cell), the use of these exemplary embodiments provides for the intra-frequency cell re-selection indicator (either common for all CSG cells or cell-specific) to be broadcast in the CSG cell together with the PCI split information, and may optionally be broadcast on the macro cell together with the PCI split information. In further exemplary embodiments, the intra-frequency cell re-selection indicator (either common for all CSG cells or cell-specific) is delivered with the PCI split information (e.g., a CSG allowed list/whitelist) in dedicated signaling.

It is noted that the intra-frequency cell reselection indicator information received by the UE 10, for example by re-selection to a CSG cell, can be used by the same UE 10 for a period of time for making further (i.e., later) cell re-selections.

Further in accordance with the exemplary embodiments of this invention, there is provided a capability to broadcast the intra-frequency cell re-selection indicator as a general indication that is valid for all CSG cells. In further exemplary embodiments, the intra-frequency cell re-selection indicator may be for a group of CSG cells using a specific PCI, or it may be specified down to a granularity of an indication per PCI in the PCI split information.

Alternatively, the intra-frequency cell re-selection indicator may be broadcast/signaled alone (without the PCI split information) on a macro cell. In this case, the intra-frequency cell re-selection indicator may be understood such that its indication is generally applied to all cells on the frequency layer, or it may be an indication applicable only for CSG cells on the frequency layer. It is also within the scope of these exemplary embodiments to use two separate intra-frequency cell re-selection indicators, for example, with one pertaining to all cells on the frequency layer and the other pertaining only to CSG cells.

In practice, the signaling unit 12E of the eNB 12 is configured to transmit, possibly in a SIB, the at least one intra-frequency cell re-selection indicator, and the cell selection/re-selection unit 10E of the UE 10 is configured to operate in accordance with the received at least one intra-frequency cell re-selection indicator.

The use of these exemplary embodiments provides enhancements to the current de facto behavior, and would result in at least the following improvements:

First, a non-CSG UE 10 (i.e., a UE with no valid whitelist and thus currently no access rights to any CSG) may immediately act according to the intra-frequency cell re-selection indicator setting (select (or not select) to a non-best cell) on a current frequency. This may be done either by simply reading the SIB from one CSG cell (and then using the intra-frequency cell re-selection indicator information received for current and/or later cell re-selections) or by obtaining this information directly from a macro cell. As a result, there would be no need for the UE to reselect to each CSG cell in order to obtain the intra-frequency cell re-selection indicator status from that cell.

Second, a CSG UE 10 (i.e., a UE with a valid whitelist) may also benefit from the use of this enhanced technique. For example, assume that the whitelist includes the PCI of the CSG. The CSG UE can use the given intra-frequency cell re-selection indicator information together with the PCI information from identified CSG cells in order to act accordingly towards CSG cells on which the UE has no access rights (e.g., a CSG cell having a PCI that is not in the whitelist of the UE 10).

While the intra-frequency cell re-selection indicator may be given on a per PCI level (i.e., per cell basis), it may also be given as a general indicator for a group of PCIs, or for all PCIs included in the PCI split information field (group of cells or all cells used for CSG).

The intra-frequency cell re-selection indicator may be valid for a certain time period (e.g., for the same time period as the PCI split information) or for another given separate time period (e.g., for a different time period from the PCI split information).

Further, there may be an intra-frequency cell re-selection indicator specifically used for CSG cells, and another intra-frequency cell re-selection indicator specifically used for non-CSG cells (macro cells).

Based on the foregoing it should be apparent that the exemplary embodiments of this invention provide a method, apparatus and computer program(s) to enhance DL signaling between an eNB and a UE with respect to at least cell selection/re-selection operations.

Figure 3:
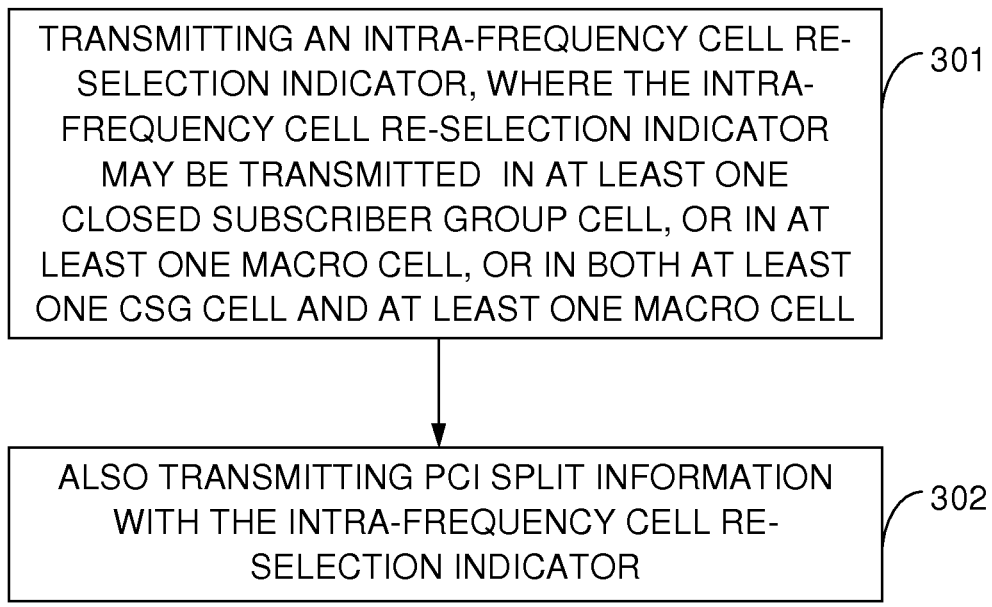
FIG. 3 is a logic flow diagram that illustrates the operation of an exemplary method (e.g., by the eNB of FIG. 2A), and a result of execution of computer program instructions embodied on a computer readable memory, in accordance with the exemplary embodiments of this invention.

FIG. 3 is a logic flow diagram that illustrates the operation of an exemplary method, and a result of execution of computer program instructions, in accordance with the exemplary embodiments of this invention.

(A) In accordance with the exemplary embodiments a method performs, at Block 301, a step of transmitting an intra-frequency cell re-selection indicator, where the intra-frequency cell re-selection indicator may be transmitted in at least one closed subscriber group cell, or in at least one macro cell, or in both at least one CSG cell and at least one macro cell, and at Block 302 also transmitting PCI split information with the intra-frequency cell re-selection indicator.

(B) In the method and result of execution of computer program instructions of the preceding paragraph, where the intra-frequency cell re-selection indicator is intended to remain valid for a period of time enabling its use for a current cell re-selection and/or a future cell re-selection.

(C) In the method and result of execution of computer program instructions of the preceding paragraphs, where the intra-frequency cell re-selection indicator applies to a group of closed subscriber group cells.

(D) In the method and result of execution of computer program instructions of paragraph (A), where the intra-frequency cell re-selection indicator applies to a single closed subscriber group cell.

(E) In the method and result of execution of computer program instructions of paragraph (A), where the intra-frequency cell re-selection indicator applies to all closed subscriber group cells.

(F) In the method and result of execution of computer program instructions of paragraph (A), where the intra-frequency cell re-selection indicator has a time associated therewith that indicates for how long the intra-frequency cell re-selection indicator is valid.

(G) In the method and result of execution of computer program instructions of paragraph (A), where the intra-frequency cell re-selection indicator is a first intra-frequency cell re-selection indicator, and where a second intra-frequency cell re-selection indicator is transmitted in a non-closed subscriber group cell.

Figure 4:
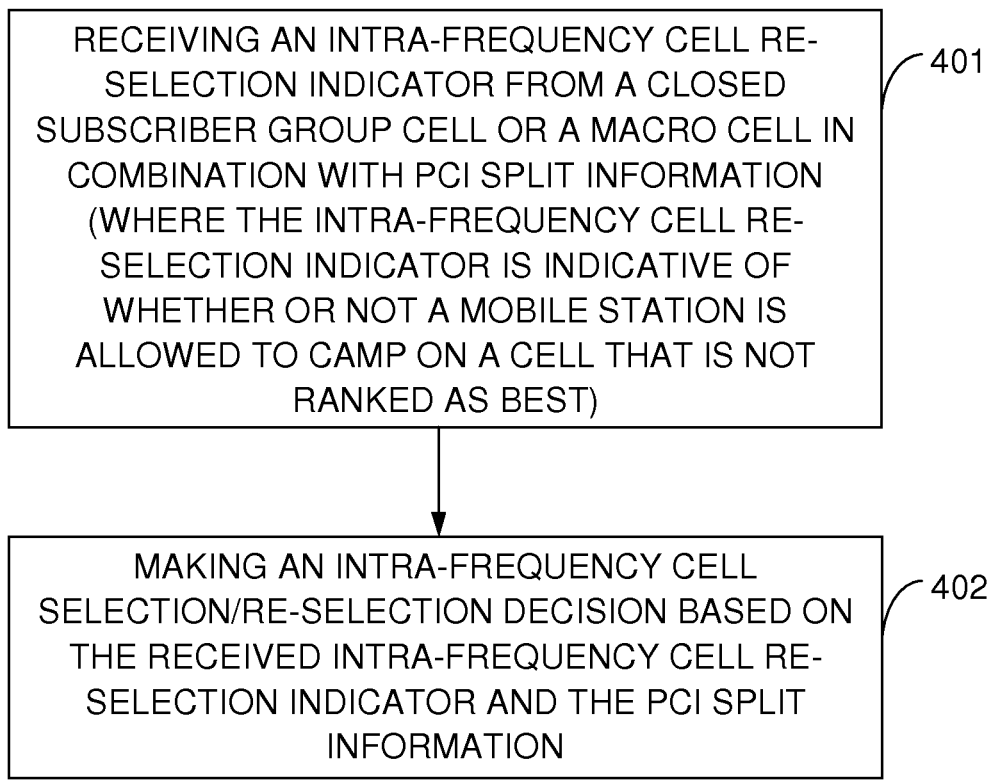
FIG. 4 is a logic flow diagram that illustrates the operation of another exemplary method (e.g., by the UE of FIG. 2A), and a result of execution of computer program instructions embodied on a computer readable memory, further in accordance with the exemplary embodiments of this invention.

FIG. 4 is a logic flow diagram that illustrates the operation of another exemplary method, and a result of execution of computer program instructions, in accordance with the exemplary embodiments of this invention.

(A) In accordance with these exemplary embodiments a method performs, at Block 401, a step of receiving an intra-frequency cell re-selection indicator from one of a closed subscriber group cell, or a macro cell, in combination with PCI split information, and at Block 402 making an intra-frequency cell selection/re-selection decision based on the received intra-frequency cell re-selection indicator and the PCI split information.

(B) In the method and result of execution of computer program instructions of the preceding paragraph, where the intra-frequency cell re-selection indicator is remains valid for a period of time enabling its use for a current cell re-selection and/or a future cell re-selection.

(C) In the method and result of execution of computer program instructions of the preceding paragraphs, where the received intra-frequency cell re-selection indicator applies to a group of closed subscriber group cells.

(D) In the method and result of execution of computer program instructions of paragraph (A), where the received intra-frequency cell re-selection indicator applies to a single closed subscriber group cell.

(E) In the method and result of execution of computer program instructions of paragraph (A), where the received intra-frequency cell re-selection indicator applies to all closed subscriber group cells.

(F) In the method and result of execution of computer program instructions of paragraph (A), where the received intra-frequency cell re-selection indicator has a time associated therewith that indicates for how long the intra-frequency cell re-selection indicator is valid.

(G) In the method and result of execution of computer program instructions of paragraph (A), where the received intra-frequency cell re-selection indicator is a first intra-frequency cell re-selection indicator, and where a second intra-frequency cell re-selection indicator is received from a non-closed subscriber group cell.

The various blocks shown in FIGS. 3 and 4 may be viewed as method steps, and/or as operations that result from operation of computer program code, and/or as a plurality of coupled logic circuit elements constructed to carry out the associated function(s).

In further non-limiting exemplary embodiments, the intra-frequency cell re-selection indicator may be included in SIB1 and refer to the cell in which it is received. The PCI split information may be included in SIB4, for example, under the name 'csg-PhysCellIdRange'. SIB type 4 (the IE SystemInformationBlockType4) includes neighboring cell related information relevant (e.g., only) for intra-frequency cell re-selection. The IE includes cells with specific re-selection parameters as well as blacklisted cells. As such, SIB4 is one example of a suitable place to include the proposed intra-frequency cell re-selection indicator information. In some exemplary embodiments, the intra-frequency cell re-selection indicator may be applicable for all CSG cells.

FIG. 6 shows an example SIB4 (i.e., ASN-1 coding therefor) that includes the proposed intra-frequency cell re-selection indicator information (the bolded, underlined portion of the IE).

Below are provided further descriptions of various non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

(1) In another exemplary embodiment, and with reference to FIG. 4, a method comprising: receiving an intra-frequency cell re-selection indicator in combination with physical cell identity split information from a closed subscriber group cell or a macro cell, where the intra-frequency cell re-selection indicator is indicative of whether or not a mobile station is allowed to camp on a cell that is not ranked as best (401); and making an intra-frequency cell selection/re-selection decision based on the received intra-frequency cell re-selection indicator and the physical cell identity split information (402).

A method as above, where the intra-frequency cell re-selection indicator applies to a plurality (group) of closed subscriber group cells. A method as in any above, where the intra-frequency cell re-selection indicator is for all closed subscriber group cells on a corresponding frequency layer. A method as in any above, where the intra-frequency cell re-selection indicator (is intended to) remains valid for a period of time enabling its use for at least one of a current cell re-selection and a future cell re-selection. A method as in any above, where the intra-frequency cell re-selection indicator has a time associated therewith that indicates for how long the intra-frequency cell re-selection indicator is valid. A method as in any above, where the intra-frequency cell re-selection indicator is a first intra-frequency cell re-selection indicator, the method further comprising: receiving a second intra-frequency cell re-selection indicator. A method as in any above, where the first intra-frequency cell re-selection indicator is for at least one closed subscriber group cell and the second intra-frequency cell re-selection indicator is for at least one non-closed subscriber group cell. A method as in any above, where the intra-frequency cell re-selection indicator is given as a general indicator for a group of PCIs. A method as in any above, where the intra-frequency cell re-selection indicator is received in a system information block. A method as in any above, where the method is performed by a mobile station.

A method as in any above, where the intra-frequency cell re-selection indicator applies to a single closed subscriber group cell. A method as in any above, where the intra-frequency cell re-selection indicator applies to all closed subscriber group cells. A method as in any above, where the intra-frequency cell re-selection indicator is given on a per cell basis. A method as in any above, where the intra-frequency cell re-selection indicator is given as a general indicator for all PCIs included in the PCI split information. A method as in any above, where the received intra-frequency cell re-selection indicator with the PCI split information comprises a broadcast transmission. A method as in any above, where the intra-frequency cell re-selection indicator is indicative of whether or not a mobile station is allowed to camp on a cell that is not ranked as best according to an intra-frequency cell re-selection evaluation procedure. A method as in any above, where a cell that is not ranked as best comprises a cell that is not most preferred. A method as in any above, where the method is performed by a mobile node, a mobile phone, a mobile unit, a portable communications unit or a cellular phone. A method as in any above, where the method is performed by a mobile station within an evolved universal terrestrial radio access network.

A method as in any above, where the intra-frequency cell re-selection indicator with the physical cell identity split information is received from a network access node, base station, Node B or eNB. A method as in any above, where the intra-frequency cell re-selection indicator with the physical cell identity split information is received by a mobile node, mobile station, mobile phone, UE, mobile computer or cellular phone. A method as in any above, where the intra-frequency cell re-selection indicator with the physical cell identity split information is received by a mobile node, mobile station, mobile phone, UE, mobile computer or cellular phone from a network access node, base station, Node B or eNB.

A method as in any above, where the intra-frequency cell re-selection indicator in combination with the physical cell identity split information is received via a broadcast transmission. A method as in any above, where the intra-frequency cell re-selection indicator in combination with the physical cell identity split information is received via dedicated signaling. A method as in any above, where the intra-frequency cell re-selection indicator applies for only one PCI in (e.g., indicated in, of) the PCI split information. A method as in any above, where the intra-frequency cell re-selection indicator applies for at least one PCI in (e.g., indicated in, of) the PCI split information. A method as in any above, where the intra-frequency cell re-selection indicator applies for a plurality of PCIs in (e.g., indicated in, of) the PCI split information. A method as in any above, where the intra-frequency cell re-selection indicator applies for all PCIs in (e.g., indicated in, of) the PCI split information.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method.

A method as in any above, further comprising one or more aspects of the exemplary embodiments of the invention as described elsewhere herein, and, in particular, one or more aspects of the exemplary embodiments of the invention as relating to exemplary methods described herein.

(2) In another exemplary embodiment, a program storage device readable by a machine, tangibly embodying a program of instructions executable by the machine for performing operations, said operations comprising: receiving an intra-frequency cell re-selection indicator in combination with physical cell identity split information from a closed subscriber group cell or a macro cell, where the intra-frequency cell re-selection indicator is indicative of whether or not a mobile station is allowed to camp on a cell that is not ranked as best (401); and making an intra-frequency cell selection/re-selection decision based on the received intra-frequency cell re-selection indicator and the physical cell identity split information (402).

A program storage device as in any above, wherein the program storage device comprises a computer-readable medium, a computer-readable memory, a memory, a memory card, a removable memory, a storage device, a storage component and/or a storage circuit.

A program storage device as in any above, further comprising one or more aspects of the exemplary embodiments of the invention as described elsewhere herein, and, in particular, one or more aspects of the exemplary embodiments of the invention as relating to exemplary methods described herein.

(3) In a further exemplary embodiment, an apparatus comprising: means for receiving an intra-frequency cell re-selection indicator in combination with physical cell identity split information from a closed subscriber group cell or a macro cell, where the intra-frequency cell re-selection indicator is indicative of whether or not a mobile station is allowed to camp on a cell that is not ranked as best; and means for making an intra-frequency cell selection/re-selection decision based on the received intra-frequency cell re-selection indicator and the physical cell identity split information.

An apparatus as above, where the means for receiving comprises at least one receiver or transceiver and the means for making an intra-frequency cell selection/re-selection decision comprises at least one processor, data processor, processing unit, processing circuitry, processing block or integrated circuit.

An apparatus as in any above, further comprising one or more aspects of the exemplary embodiments of the invention as described elsewhere herein, and, in particular, one or more aspects of the exemplary embodiments of the invention as relating to exemplary apparatus described herein.

(4) In another exemplary embodiment, an apparatus comprising: a receiver (at least one) configured to receive an intra-frequency cell re-selection indicator in combination with physical cell identity split information from a closed subscriber group cell or a macro cell, where the intra-frequency cell re-selection indicator is indicative of whether or not a mobile station is allowed to camp on a cell that is not ranked as best; and a processor (at least one) configured to make an intra-frequency cell selection/re-selection decision based on the received intra-frequency cell re-selection indicator and the physical cell identity split information.

An apparatus as in any above, further comprising one or more aspects of the exemplary embodiments of the invention as described elsewhere herein, and, in particular, one or more aspects of the exemplary embodiments of the invention as relating to exemplary apparatus described herein.

(5) In a further exemplary embodiment, an apparatus comprising: reception circuitry configured to receive an intra-frequency cell re-selection indicator in combination with physical cell identity split information from a closed subscriber group cell or a macro cell, where the intra-frequency cell re-selection indicator is indicative of whether or not a mobile station is allowed to camp on a cell that is not ranked as best; and processing circuitry configured to make an intra-frequency cell selection/re-selection decision based on the received intra-frequency cell re-selection indicator and the physical cell identity split information.

An apparatus as in any above, further comprising one or more aspects of the exemplary embodiments of the invention as described elsewhere herein, and, in particular, one or more aspects of the exemplary embodiments of the invention as relating to exemplary apparatus described herein.

Figure 5:
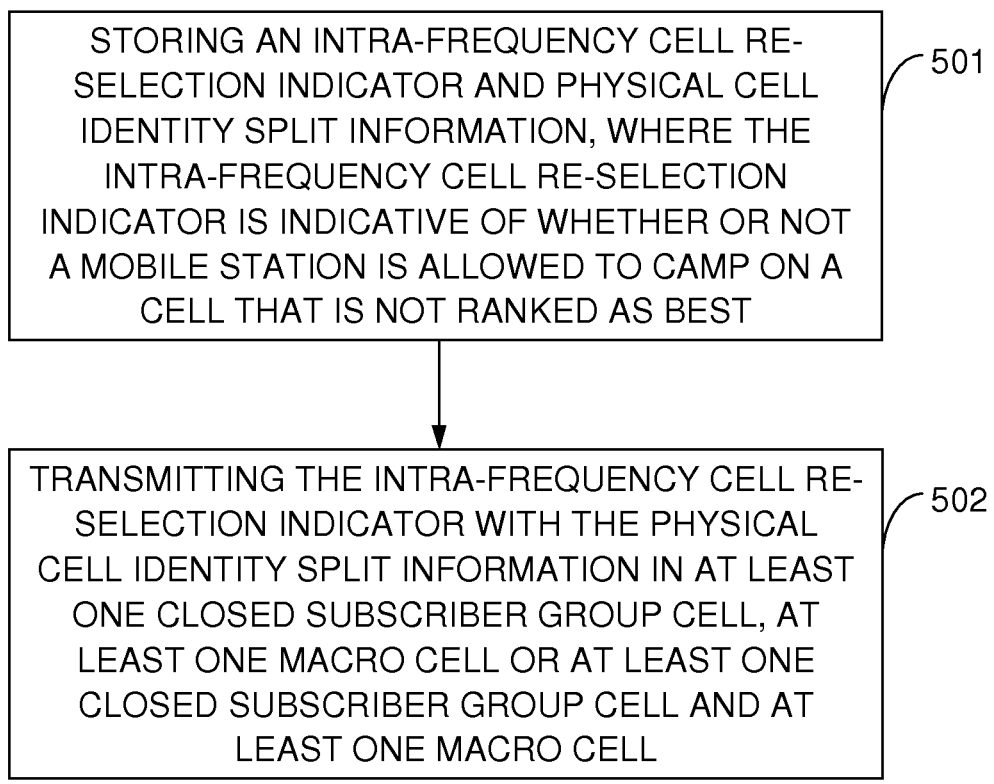
FIG. 5 is a logic flow diagram that illustrates the operation of a further exemplary method (e.g., by the eNB of FIG. 2A), and a result of execution of computer program instructions embodied on a computer readable memory, further in accordance with the exemplary embodiments of this invention.

(6) In one exemplary embodiment, and with reference to FIG. 5, a method comprising: storing an intra-frequency cell re-selection indicator and physical cell identity split information, where the intra-frequency cell re-selection indicator is indicative of whether or not a mobile station is allowed to camp on a cell that is not ranked as best (501); and transmitting the intra-frequency cell re-selection indicator with the physical cell identity split information in at least one closed subscriber group cell, at least one macro cell or at least one closed subscriber group cell and at least one macro cell (502).

A method as above, where the intra-frequency cell re-selection indicator applies to a plurality (group) of closed subscriber group cells. A method as in any above, where the intra-frequency cell re-selection indicator is for all closed subscriber group cells on a corresponding frequency layer. A method as in any above, where the intra-frequency cell re-selection indicator (is intended to) remains valid for a period of time enabling its use for at least one of a current cell re-selection and a future cell re-selection. A method as in any above, where the intra-frequency cell re-selection indicator has a time associated therewith that indicates for how long the intra-frequency cell re-selection indicator is valid. A method as in any above, where the intra-frequency cell re-selection indicator is a first intra-frequency cell re-selection indicator, the method further comprising: transmitting a second intra-frequency cell re-selection indicator. A method as in any above, where the first intra-frequency cell re-selection indicator is for at least one closed subscriber group cell and the second intra-frequency cell re-selection indicator is for at least one non-closed subscriber group cell. A method as in any above, where the intra-frequency cell re-selection indicator is given as a general indicator for a group of PCIs. A method as in any above, where the intra-frequency cell re-selection indicator is transmitted in a system information block. A method as in any above, where the method is performed by a network access node.

A method as in any above, where the intra-frequency cell re-selection indicator applies to a single closed subscriber group cell. A method as in any above, where the intra-frequency cell re-selection indicator applies to all closed subscriber group cells. A method as in any above, where the intra-frequency cell re-selection indicator is given on a per cell basis. A method as in any above, where the intra-frequency cell re-selection indicator is given as a general indicator for all PCIs included in the PCI split information. A method as in any above, where the transmission of the intra-frequency cell re-selection indicator and the PCI split information comprises a broadcast transmission. A method as in any above, where the intra-frequency cell re-selection indicator is indicative of whether or not a mobile station is allowed to camp on a cell that is not ranked as best according to an intra-frequency cell re-selection evaluation procedure. A method as in any above, where a cell that is not ranked as best comprises a cell that is not most preferred. A method as in any above, where the method is performed by a base station. A method as in any above, where the method is performed by an evolved Node B. A method as in any above, where the method is performed by a network access node within an evolved universal terrestrial radio access network.

A method as in any above, where the intra-frequency cell re-selection indicator with the physical cell identity split information is transmitted from a network access node, base station, Node B or eNB. A method as in any above, where the intra-frequency cell re-selection indicator with the physical cell identity split information is transmitted to/towards a mobile node, mobile station, mobile phone, UE, mobile computer or cellular phone. A method as in any above, where the intra-frequency cell re-selection indicator with the physical cell identity split information is transmitted from a network access node, base station, Node B or eNB to/towards a mobile node, mobile station, mobile phone, UE, mobile computer or cellular phone.

A method as in any above, where the intra-frequency cell re-selection indicator in combination with the physical cell identity split information is transmitted via a broadcast transmission. A method as in any above, where the intra-frequency cell re-selection indicator in combination with the physical cell identity split information is transmitted via dedicated signaling. A method as in any above, where the intra-frequency cell re-selection indicator applies for only one PCI in (e.g., indicated in, of) the PCI split information. A method as in any above, where the intra-frequency cell re-selection indicator applies for at least one PCI in (e.g., indicated in, of) the PCI split information. A method as in any above, where the intra-frequency cell re-selection indicator applies for a plurality of PCIs in (e.g., indicated in, of) the PCI split information. A method as in any above, where the intra-frequency cell re-selection indicator applies for all PCIs in (e.g., indicated in, of) the PCI split information.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method.

A method as in any above, further comprising one or more aspects of the exemplary embodiments of the invention as described elsewhere herein, and, in particular, one or more aspects of the exemplary embodiments of the invention as relating to exemplary methods described herein.

(7) In another exemplary embodiment, a program storage device readable by a machine, tangibly embodying a program of instructions executable by the machine for performing operations, said operations comprising: storing an intra-frequency cell re-selection indicator and physical cell identity split information, where the intra-frequency cell re-selection indicator is indicative of whether or not a mobile station is allowed to camp on a cell that is not ranked as best (501); and transmitting the intra-frequency cell re-selection indicator with the physical cell identity split information in at least one closed subscriber group cell, at least one macro cell or at least one closed subscriber group cell and at least one macro cell (502).

A program storage device as in any above, wherein the program storage device comprises a computer-readable medium, a computer-readable memory, a memory, a memory card, a removable memory, a storage device, a storage component and/or a storage circuit.

A program storage device as in any above, further comprising one or more aspects of the exemplary embodiments of the invention as described elsewhere herein, and, in particular, one or more aspects of the exemplary embodiments of the invention as relating to exemplary methods described herein.

(8) In a further exemplary embodiment, an apparatus comprising: means for storing an intra-frequency cell re-selection indicator and physical cell identity split information, where the intra-frequency cell re-selection indicator is indicative of whether or not a mobile station is allowed to camp on a cell that is not ranked as best; and means for transmitting (means for sending or means for communicating) the intra-frequency cell re-selection indicator with the physical cell identity split information in at least one closed subscriber group cell, at least one macro cell or at least one closed subscriber group cell and at least one macro cell.

An apparatus as above, where the means for storing comprises at least one memory and the means for transmitting comprises at least one transmitter or transceiver.

An apparatus as in any above, further comprising one or more aspects of the exemplary embodiments of the invention as described elsewhere herein, and, in particular, one or more aspects of the exemplary embodiments of the invention as relating to exemplary apparatus described herein.

(9) In another exemplary embodiment, an apparatus comprising: at least one memory configured to store an intra-frequency cell re-selection indicator and physical cell identity split information, where the intra-frequency cell re-selection indicator is indicative of whether or not a mobile station is allowed to camp on a cell that is not ranked as best; and at least one processor (or at least one transmitter) configured to transmit the intra-frequency cell re-selection indicator with the physical cell identity split information in at least one closed subscriber group cell, at least one macro cell or at least one closed subscriber group cell and at least one macro cell.

An apparatus as in any above, further comprising one or more aspects of the exemplary embodiments of the invention as described elsewhere herein, and, in particular, one or more aspects of the exemplary embodiments of the invention as relating to exemplary apparatus described herein.

(10) In a further exemplary embodiment, an apparatus comprising: storage circuitry configured to store an intra-frequency cell re-selection indicator and physical cell identity split information, where the intra-frequency cell re-selection indicator is indicative of whether or not a mobile station is allowed to camp on a cell that is not ranked as best; and transmission circuitry (or communication circuitry) configured to transmit the intra-frequency cell re-selection indicator with the physical cell identity split information in at least one closed subscriber group cell, at least one macro cell or at least one closed subscriber group cell and at least one macro cell.

An apparatus as in any above, further comprising one or more aspects of the exemplary embodiments of the invention as described elsewhere herein, and, in particular, one or more aspects of the exemplary embodiments of the invention as relating to exemplary apparatus described herein.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device (e.g., a computer-readable medium, a memory) readable by a machine (e.g., a computer, a mobile station, a mobile device, a mobile node), tangibly embodying a program of instructions (e.g., a program, a computer program) executable by the machine for performing operations. The operations comprise steps of utilizing the exemplary embodiments or steps of the method.

The various blocks shown in FIGS. 3-5 may be viewed as method steps, as operations that result from operation of computer program code and/or as one or more coupled components (e.g., function blocks, circuits, integrated circuits, logic circuit elements) constructed to carry out the associated function(s). The blocks may also be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments of the invention.

Furthermore, the arrangement of the blocks shown in FIGS. 3-5 should be considered merely exemplary and non-limiting. It should be appreciated that the blocks may correspond to one or more functions and/or operations that may be performed in any order (e.g., any practicable, suitable and/or feasible order) and/or concurrently (e.g., as practicable, suitable and/or feasible) so as to implement one or more of the exemplary embodiments of the invention. In addition, one or more additional steps, functions and/or operations may be utilized in conjunction with those illustrated in FIGS. 3-5 so as to implement one or more further exemplary embodiments of the invention, such as those described in further detail herein.

That is, the non-limiting, exemplary embodiments of the invention shown in FIGS. 3-5 may be implemented, practiced or utilized in conjunction with one or more further aspects in any combination (e.g., any combination that is practicable, suitable and/or feasible) and are not limited only to the blocks, steps, functions and/or operations illustrated in FIGS. 3-5.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

Further, the various names used for the described parameters, information elements and assemblages of information elements (e.g., CSG, PCI split, SIB, etc.) are not intended to be limiting in any respect, as these parameters, information elements and assemblages of information elements may be identified by any suitable names.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   receiving an intra-frequency cell re-selection indicator in combination with physical cell identity split information from, at least one of a closed subscriber group cell and a macro cell, where the intra-frequency cell re-selection indicator is indicative of whether or not a mobile station is allowed to camp on a cell that is not ranked as best, and where the physical cell identity split information indicates information about a reservation of physical cell identities to be used for closed subscriber group cells; and
   making an intra-frequency cell selection/re-selection decision based on the received intra-frequency cell re-selection indicator and the physical cell identity split information.

2. The method of claim 1, where the intra-frequency cell re-selection indicator applies to at least one or more closed subscriber group cells.

3. The method of claim 1, where the intra-frequency cell re-selection indicator is for all closed subscriber group cells on a corresponding frequency layer.

4. The method of claim 1, where the intra-frequency cell re-selection indicator remains valid for a period of time enabling its use for at least one of a current cell re-selection and a future cell re-selection.

5. The method of claim 1, where the intra-frequency cell re-selection indicator has a time associated therewith that indicates for how long the intra-frequency cell re-selection indicator is valid.

6. The method of claim 1, where the intra-frequency cell re-selection indicator is a first intra-frequency cell re-selection indicator, the method further comprising:
   receiving a second intra-frequency cell re-selection indicator.

7. The method of claim 6, where the first intra-frequency cell re-selection indicator is for at least one closed subscriber group cell and the second intra-frequency cell re-selection indicator is for at least one non-closed subscriber group cell.

8. The method of claim 1, where the intra-frequency cell re-selection indicator is given as a general indicator for a group of physical cell identities.

9. The method of claim 1, where the intra-frequency cell re-selection indicator is received in a system information block.

10. A non-transitory computer program product comprising a computer-readable medium bearing computer program code embodied therein for use with a computer, the computer program code comprising:
   code for receiving an intra-frequency cell re-selection indicator in combination with physical cell identity split information from at least one of a closed subscriber group cell and a macro cell, where the intra-frequency cell re-selection indicator is indicative of whether or not a mobile station is allowed to camp on a cell that is not ranked as best, and where the physical cell identity split information indicates information about a reservation of physical cell identities to be used for closed subscriber group cells; and code for making an intra-frequency cell selection/re-selection decision based on the received intra-frequency cell re-selection indicator and the physical cell identity split information.

11. The program storage device of claim 10, where the intra-frequency cell re-selection indicator applies to at least one or more closed subscriber group cells.

12. An apparatus comprising:
at least one processor; and at least one memory including computer program code, where the at least one memory and the computer program code are configured, with the at least one processor, to cause the apparatus to at least store an intra-frequency cell re-selection indicator and physical cell identity split information, where the intra-frequency cell re-selection indicator is indicative of whether or not a mobile station is allowed to camp on a cell that is not ranked as best, and where the physical cell identity split information indicates information about a reservation of physical cell identities to be used for closed subscriber group cells; and
transmit the intra-frequency cell re-selection indicator with the physical cell identity split information in at least one of a closed subscriber group cell and a macro cell.

13. The apparatus of claim 12, where the intra-frequency cell re-selection indicator applies to a plurality of closed subscriber group cells.

14. The apparatus of claim 12, where the intra-frequency cell re-selection indicator is for all closed subscriber group cells on a corresponding frequency layer.

15. The apparatus of claim 12, where the intra-frequency cell re-selection indicator remains valid for a period of time enabling its use for at least one of a current cell re-selection and a future cell re-selection.

16. The apparatus of claim 12, where the intra-frequency cell re-selection indicator has a time associated therewith that indicates for how long the intra-frequency cell re-selection indicator is valid.

17. The apparatus of claim 12, where the infra-frequency cell re-selection indicator is a first intra-frequency cell re-selection indicator, the at least one memory and the computer program code are configured, with the at least one processor, to cause the apparatus further to: transmit a second intra-frequency cell re-selection indicator.

18. The apparatus of claim 17, where the first intra-frequency cell re-selection indicator is for at least one closed subscriber group cell and the second intra-frequency cell re-selection indicator is for at least one non-closed subscriber group cell.

19. The apparatus of claim 12, where the infra-frequency cell re-selection indicator is given as a general indicator for a group of physical cell identities.

20. The apparatus of claim 12, where the intra-frequency cell re-selection indicator is received in a system information block.

* * * * *